United States Patent [19]
Hadley

[11] 3,966,162
[45] June 29, 1976

[54] REMOTE CONTROL REARVIEW MIRROR

[75] Inventor: Richard Marshall Hadley, Jackson, Tenn.

[73] Assignee: Harman International Industries, Inc., Grandville, Mich.

[22] Filed: June 12, 1974

[21] Appl. No.: 478,699

[52] U.S. Cl. .............................. 248/487; 74/501 M; 403/58; 403/121
[51] Int. Cl.² ............................................ A47G 1/24
[58] Field of Search .......... 74/501 M; 248/487, 479, 248/480, 486; 403/57, 58, 121

[56] References Cited
UNITED STATES PATENTS

| | | | |
|---|---|---|---|
| 1,597,659 | 8/1926 | Hoerr | 248/295 |
| 1,637,520 | 8/1927 | Dodge | 403/121 |
| 1,700,120 | 1/1929 | Campbell | 248/295 |
| 2,931,602 | 4/1960 | Ferguson | 248/479 |
| 3,323,842 | 6/1967 | Hanson | 403/121 |
| 3,570,799 | 3/1971 | Schwartz | 248/479 X |
| 3,592,074 | 7/1971 | Petersen | 74/501 M |
| 3,780,598 | 12/1973 | Menger | 74/501 M |
| 3,800,619 | 4/1974 | McIntyre | 74/501 M |

Primary Examiner—William H. Schultz
Attorney, Agent, or Firm—Miller, Morriss, Pappas & McLeod

[57] ABSTRACT

An improved compression pivot and support combination as for remote control rearview mirrors and the like, having an arcuate lobe integrally depending from a bar and the bar including integral spherical extensions at the ends thereof and wherein the connecting bar has a triangular cross section configuration intersecting the spherical profiles of the spherical extensions. The support sockets or dimples into which the spherical extensions are inserted are spaced apart in the support face and one of such dimples is elongate.

2 Claims, 6 Drawing Figures

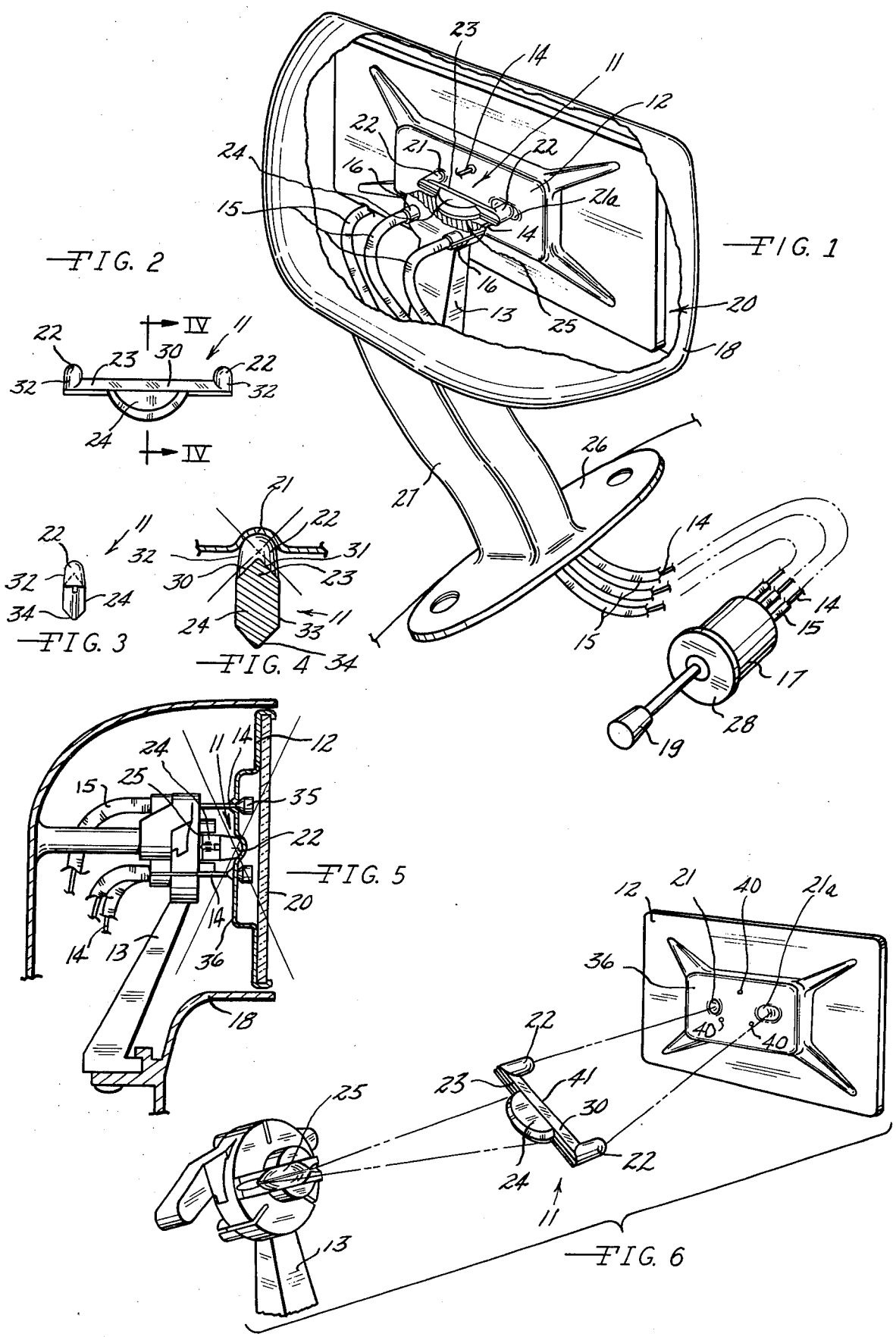

REMOTE CONTROL REARVIEW MIRROR

BACKGROUND OF THE INVENTION

A considerable number of structures have been proposed in an effort to successfully restrain vibrational tendencies in vehicles from causing rotation of remote control mirror faces in the plane of the glass and without interfering with the universal pivoting action at the mirror which mimics the motion imparted to tensioned cables from a remote operating handle and actuator. The actuator is usually adjacent the driver in a vehicle. One of the most interesting means has been the insertion of an integrated pair of compression pivots intermediate a mirror back and a support pedestal. In this manner lineal pivots are formed which allow for rotation on a pair of transverse axes thereby allowing a substantially uniform and substantial non-eccentric rotation as between a fixed element (pedestal) and movable element (mirror) and the latter moving in accord with coordinated cable displacement. Such a system is generally embodied in the application for U.S. Letters Patent, Ser. No. 403,192.

In the U.S. Pat. No. 3,780,598 of Keith J. Menger, a single piece compression mounted element is shown which comprises a pair of spaced apart spherical extensions connected together by a connecting arm having a flat upper surface and having a depending arcuate lower extension. The two spherical extensions impinge into mating dimples provided in a mirror back. The arcuate lower extension extends into a slot and the slot allows the limited rocking of the entire compression element on the arcuate extension in the slot in a direction transverse to the axis of said arcuate extension. This tilts the arm and attached spherical portions while rocking in the slots and allowing the mirror or mirror back to also move around an axis defined by the two spherical extensions. This (to the extent of avoiding interference) allows a universal movement of the mirror while preventing rotation of the mirror glass or glass case or back. The problem of such a construction is that compactness is sacrificed by requiring unusual extension of the spherical elements to increase the movement limits and if compactness is retained the dimension of the flats in the arm imposes interference restrictions as it encounters the mirror case or back.

Accordingly, the present invention is addressed to the provision of an improved compression pivot structure and more particularly to a compact arrangement of a compression pivot structure while allowing maximum rotational excursion of the mirror or mirror case on the spherical surfaces while under restraint against rotation of the mirror in the plane of the mirror. Other objects, substantially simplifying the compression pivot seen in U.S. Pat. No. 3,780,598 will become increasingly apparent as the description proceeds.

GENERAL DESCRIPTION

In general, the present invention is a compression pivot structure interposed between two elements, one a fixed pedestal, for example, and one a movable mirror (usually backed) in which the combination of pivot, pedestal and mirror or mirror back results in allowing a limited universal movement of the mirror while preventing rotation of the mirror in the plane of the glass. The mirror is moved as by cables or wires in tension relation to the mirror and remotely manipulated. The tension in the wires or cables draws the mirror or mirror back firmly against the pivot structure and the pivot structure is thus pressed against the pedestal in compression between mirror and pedestal. To maintain maximum compactness with minimum size of the intermediate compression pivot structure, a relief in the arm portion is provided as between the pair of spaced apart spherical extensions. The relief does not extend the spherical surfaces outwardly. However, by modifying the cross section of the arm or back intermediate the spheres the motion on the axis defined by the sphere centers is enhanced. Additional "throw" is experienced without extension of the dimension between pedestal and mirror back. The performance range of the mirror is extended without impairment of the restraint against rotation in the plane of the mirror glass. As will also be appreciated by slotting one of the two dimples in the mirror case or back, the dimples are rendered more tolerant of sphere position interval while assuming adequate restraint. The result is an integral pivot element providing a conrolled axis movement on two spaced apart axes to allow movement in one of two support structures, one serving one axis and the other serving the other axis in prevention of rotation of the mirror or movable element in the plane of the mirror.

IN THE DRAWINGS

FIG. 1 is a perspective view, partially cut away, to show a remote control rearview mirror in which the compression pivot structure of the present invention is shown between the support in the pedestal and the support in the mirror back.

FIG. 2 is a side elevation view of the compression pivot element.

FIG. 3 is an end elevation view of the compression pivot element shown in FIG. 2.

FIG. 4 is a cross section enlarged view of the compression pivot element seen in FIG. 2 and taken on the line IV—IV revealing the enhancement of movementlimits in relation to a cup-like socket.

FIG. 5 is a side view elevation, partially cut away, to reveal the compression pivot element in the mirror housing between pedestal and mirror back.

FIG. 6 is a perspective exploded view showing the assembly interrelationship between pedestal compression pivot element and mirror back, slotted at one socket in the pair of spherical supports.

SPECIFIC DESCRIPTION

Referring to the drawing and in particular the FIG. 1 thereof, the present invention is seen as a compression pivot 11 located between a mirror back 12 and a support pedestal 13 and compressed between the pedestal 13 and mirror back 12 by the action of a plurality of tensioned cables or wires 14 which run in sheaths 15 which sheaths 15 are in compression relation between the pockets 16 in the pedestal 13 and the actuator case 17. The actuator case 17 is remotely positioned from the mirror housing 18 and the control cables or wires 14 pass from the actuator case 17 through the mirror housing 18 and to connection at the mirror back 12. Tension means in the actuator case 17, for example, assures net tension in the cables or wires 14 and manipulation of the actuator handle 19 by the driver of a vehicle, for example, causes remote mimic action in the mirror 20. The universal-like action at the mirror end of the remote control rearview mirror structure occurs as a consequence of providing two separate but coordinated axes of movement in the relationship of the compression pivot 11 to the pedestal 13 and the mirror back 12.

A pair of spaced apart hemispheric depressions 21 and 21a (the latter in the form of a slot rather than a dimple) receive the spherical extensions 22 of the compression pivot 11 so that a tilt axis is formed which passes through the centers of the two spherical extensions 22. An arm portion 23 of the compression pivot 11 integrally connects at its ends with the spherical extensions 22. The arm 23 is essentially triangular in cross section and the plane surfaces of the arm 23 intersect and truncate the spherical extensions 22 at or slightly below the centers of the spherical extensions 22. Accordingly, the spherical extensions 22 are actually spherical cap portions on cylindrical ends integral with the arm 23.

Intermediate the ends of the arm 23 is an arcuate disc shaped projection 24 which nests in a slot 25 in the pedestal 13 thereby providing a second axis for movement influencing or controlling the motion available to the mirror 20.

In use, the mirror housing 18 is secured to the door, fender or other structural element of an automobile, for example, by screws or other well known fasteners extending through the flange 26 of the base extension 27 of the mirror housing 18. The actuator case 17 is secured in position as by an escutcheon element 28 through the dash or panel of the automobile, for example.

The details of the compression pivot 11 are better understood by reference to the FIGS. 2, 3 and 4. The spherical extensions 22, the arm portion 23 and the arcuate projecting tab 24 are all integrally formed as by injection molding or the like. The triangular cross section of the arm 23 is seen in the converging planes 30 and 31 which extend to truncate the cylindrical portions 32 of the spherical extensions 22 at or slightly below the centers of the spherical extensions 22. The consequence of this construction is to extend the excursion of movement about the axis formed by the spherical surfaces 22 because the triangular surface of the arm 23 flowing into and truncating the extensions 22 provide avoidance of interference with plane surfaces between the depressions or dimples 21 and 22.

The plane flanks 33 on the arcuate extension 24 result in stabilization of the compression pivot 11 in the arcuate slot 25 so that motion of the pivot 11 only occurs on the axis transverse to the arcuate extension 24 such axis approximating intersection with the intersection of the plane surfaces 30 and 31 of the triangular cross sectioned arm 23. The knife edge arc 34 of the compression pivot 11 assists in smooth rotation in the groove 25.

FIG. 5 relates the compression pivot 11 to location between the mirror back 12 and the pedestal 13, the latter secured in the case 18 as desired. The cables 15 draw the mirror back 12 against the spherical projections 22 in the dimples 21 and 21a. The ferrules 35 connected to the ends of cables 15 and nesting in the embossed portion 36 of the mirror back 12 provide thrust buttresses for the tensioned cables 15. The arcuate extension 24 nests between the flanks of the slot 25 in compression relation to the pedestal 13. As thus shown, two axes are provided by the compression pivot. One is through the centers of the spherical extensions 22 and the other is transverse of the arcuate extension 24 thereby providing a pair of substantially intersecting axes in compound control over universal positioning of the mirror 20 and with the excursion limits extended by the uninterrupted triangular cross section arm 23. This prevents rotation of the mirror 20 in the plane of the mirror 20 since the axes are each independently stabilized.

The simplicity of the construction is best understood by reference to the FIG. 6 since the pedestal 13 is seen to provide a fixed buttress for the compression pivot 11 while allowing rotation of the pivot 11 about the axis established by the arcuate groove 25 controlling movement of the pivot on the arcuate extension 24. The spherical extensions 22 extend into the dimples or hemispheric spaced apart mating grooves 21 and 21a in the mirror back 12. By slotting the depression 21a tolerances in the system are relaxed so that less precise fits as between dimples 21 and spherical extensions 22 are allowable without adverse performance result. The embossed back portion 36 is seen and the cable orifices 40 are shown in 120° intervals providing three control vectors. The triangular cross section of the arm 23 seen exemplified by the plane 30 results in an apex edge 41 which is at or immediately adjacent the axis established throughout the spherical projections and, substantially intersected or on the line of the axis through the arcuate extension 24.

In operation, the described construction is compact, smooth in performance and results in a highly stabilized mirror restrained from rotational tendencies in the plane of the glass and allows more travel or excursion about the spherical extensions 22 than in prior constructions and in delimitation of criticality between the interval of the spherical extension 22 and the depressions 21 and 21a.

Having thus described my invention by the expression of one operating embodiment thereof, others skilled in the art will appreciate modifications and improvements therein and such modifications and improvements are intended to be included hereunder limited only to the scope of my hereinafter appended claims:

I claim:

1. An improved compression pivot structure for remote rearview mirrors and the like comprising:
    a pedestal having an arcuate slot therein;
    a compression pivot comprising an arm having a triangular cross section, a pair of cylindrical extensions, said cylindrical extensions forming truncated cylindrical portions at their intersections with said arm, one at each end of said arm and integral therewith, both of said extensions being on separate but parallel spaced apart axis, and each of said extensions being topped by a spherical surface having its center at or slightly above the intersection of a mirror facing apex of said triangular cross section of said arm with said extensions, and an arcuate disk integral with and extending from said arm intermediate the ends thereof, said disk having a center of arc substantially on a line passing through the centers of said spherical surfaces and in the plane including the axis of said cylindrical extension; and
    a mirror back pressed against said compression pivot member having a pair of spaced apart depressions into which said spherical extensions nestably and rockably seat, one of said depressions being a channel or slot formed in said mirror back, said slot having an axis coextensive with an axis through said spherical surfaces.

2. The pivot structure of claim 1 wherein the arcuate disk is provided with a knife edge whereby said compression pivot rotates smoothly in the arcuate slot of said pedestal.

\* \* \* \* \*